Oct. 11, 1960     W. M. KOHRING     2,956,220
CONDENSER ASSEMBLY WITH CONTACT STRUCTURE
Filed Aug. 3, 1953
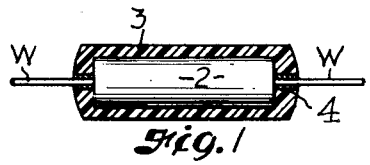
Fig. 1
Fig. 6
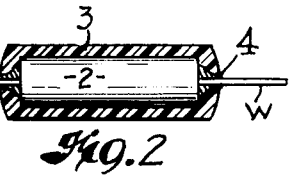
Fig. 2
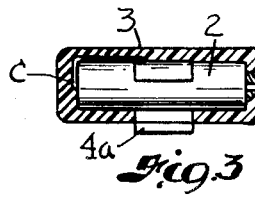
Fig. 3
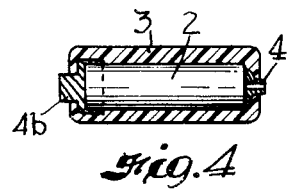
Fig. 4
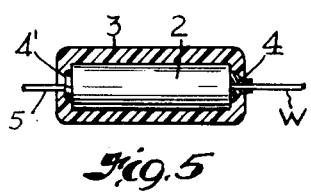
Fig. 5
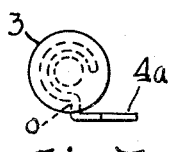
Fig. 7
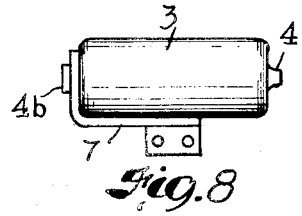
Fig. 8
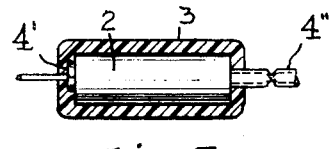
Fig. 5a
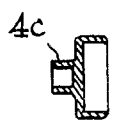
Fig. 9
Fig. 10
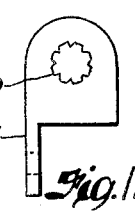
Fig. 11
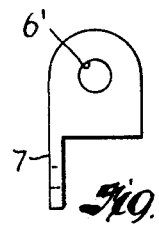
Fig. 12
Fig. 14
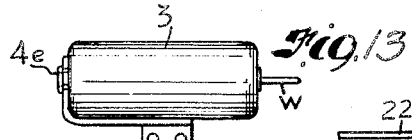
Fig. 13
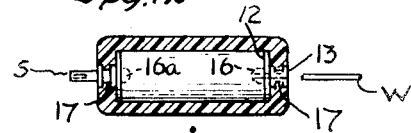
Fig. 15
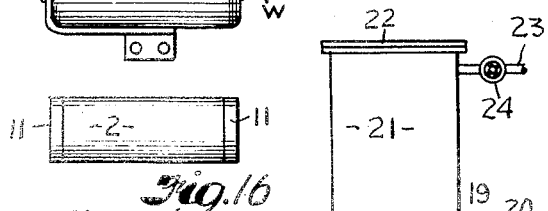
Fig. 16
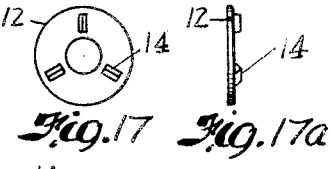
Fig. 17   Fig. 17a
Fig. 18   Fig. 18a
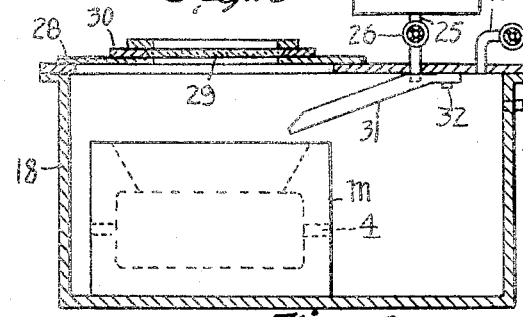
Fig. 19
INVENTOR.
WILBUR M. KOHRING
BY
Oberlin & Limbach
ATTORNEYS.

United States Patent Office 2,956,220
Patented Oct. 11, 1960

2,956,220

CONDENSER ASSEMBLY WITH CONTACT STRUCTURE

Wilbur M. Kohring, 11729 Detroit Ave., Cleveland, Ohio

Filed Aug. 3, 1953, Ser. No. 371,853

2 Claims. (Cl. 317—260)

Foil-wound condensers are under the disadvantage of having a multiplicity of interstitial spaces, and these can carry air and moisture, correspondingly interfering with optimum functioning of the condenser. Various suggestions have been made from time to time in effort to mitigate such condition, but a completely satisfactory construction has not been attained, such as to afford wholly reliable non-erratic functioning. The present invention approaches the problem in a fundamental angle and makes possible highly satisfactory results in devices of this character. And, withal, costs are relatively low. Other objects and advantages will appear from the following description.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is an axial sectional view of a condenser in accordance with the invention;

Figs. 2, 3, 4, 5, 5a and 15 are axial sectional views of modified forms;

Fig. 6 is an end view of a terminal in Fig. 5;

Fig. 7 is an end view of the structure in Fig. 3;

Fig. 8 is a side elevational view of the condenser in Fig. 4 with its mounting bracket;

Figs. 9 and 10 are respectively an axial section and an end elevation of slightly modified end caps;

Fig. 11 is an end elevational view of the mounting bracket in Fig. 8;

Fig. 12 is a similar view of a slightly modified form of bracket;

Fig. 13 is a side elevational view of a modified form of attachment of the mounting bracket;

Fig. 14 is an end elevational view of another form of mounting bracket;

Fig. 16 is a side elevation showing the assembly of the condenser in Fig. 15;

Figs. 17 and 18 and 17a and 18a are enlarged end elevations and side elevations of forms of contact discs in the condenser of Fig. 15; and Fig. 19 is a sectional view of means applicable in the production of the improved condensers.

With a foil-wound condenser body 2 embodying spirally wound foil strips with an interposed insulating strip, as in customary form, I apply terminals and special insulative features. The terminal 4, Figs. 1–5 and 8, is a hollow eyelet; and terminal 4', Figs. 5 and 6, involves a tinned wire 5 which is shaped at on end into a spiral coil, the main stem of the terminal wire being thus centered with respect to the coiled end, and this flat coiled end is apposed and connected to the foil end; it being understood that each of the foil spiral wound strips projects beyond its companion strip at the respective ends.

To effect a good connection, a suitable procedure is to solder the terminals to the foil end or to apply a settable metal in fluid form, such as colloidal silver. The usual paper interwound between the foil strips is employed or in some cases a non-absorptive, non-cellulosic, synthetic resin film material, as "Mylar" insulating sheet or the like. The eyelet by providing an opening through, makes it possible to apply a vacuum to the interior, and draw out air and moisture, and it is thus possible to supply an insulating filler, gaseous, liquid, or settable liquid, to fill interstitial spaces. Finally a wire w can be secured in the eyelet. Where the eyelet is not needed, the terminal 4' may be used. With the assembled terminals and condenser body, an insulation encasement 3 is molded on, this being of suitable material such as polystyrene, phenol-aldehyde, silicone resin, etc. And in the application of this, a peculiarity is that the insulating material in liquid form is supplied under vacuum conditions.

By providing eyelets 4, as shown in Fig. 2, a vacuum can be applied, and then an insulative fluid, as oil, molten wax, helium, etc., and the eyelet opening having served this purpose is then closed, terminal wires w being inserted into the eyelets and secured by soldering or by colloidal metal, e.g., silver as afore-mentioned. In some cases a combination of terminal forms as in Fig. 5 is desired, wherein one terminal is of the flat coil-end type 4', and the other is of the eyelet type 4. And, as in Fig. 5a, one terminal 4' may be used, while the other terminal is a small tube 4" of soft metal, such as copper, brass, or aluminum, through which a vacuum may be applied and then an insulative fluid such as helium, oil, molten wax, etc., and then the tube is sealed shut by pinching and/or soldering.

As shown in Fig. 3, besides the eyelet 4 at one end, the other end of the condenser body, i.e., the other foil strip is provided with a metallic connection c which extends centrally toward a terminal 4a, Figs. 3 and 7, this being of a form such that when the insulating material is supplied to the assemblage in the mold, the terminal 4a is anchored by the encasement. The shape of the terminal is seen, in end view Fig. 7, to be such as to partly encircle the condenser and have an off-set o providing stand-off thickness for the insulation encasement, and thence having a slotted or perforated end to receive a mounting screw or bolt or the like. By reason of the eyelet 4, here again it is possible to apply a vacuum to the condenser assemblage and supply an insulative fluid, e.g. oil, and then the terminal wire w is inserted in the eyelet and secured, as above described.

A terminal in the form of a metallic cap with a central hub 4b, Fig. 4, of cylindrical form, preferably very slightly tapered, is of particular convenience in some cases. Thus, as shown in Fig. 8 this form of terminal lends itself to easy and rapid assembly with a supporting bracket 7, thereby simplifying mountage-assembly. In this, the mounting bracket has an opening 6, Fig. 11, with inwardly-directed ribs such that when the condenser is pushed with its terminal hub 4b into the opening of the bracket, the ribs make a scored fit and grip the condenser particularly firmly. At the same time a great advantage of this is that extra good electrical connection is secured by reason of the scoring and forming clean metal surfaces which seize. The cap terminal instead of having a solid hub may in some cases have a tubular hub 4c, Fig. 9. Its relationship and usage is the same as for the solid hub form of cap. Instead of having the scoring ribs on the bracket as in Fig. 11, the bracket may in some cases have a smooth hole 6', Fig. 12, while the end cap, as shown in end view in Fig. 10 may have a hub 4d with radial ribs. Here again, when the condenser with this end cap hub is pressed into the hole 6', Fig. 12, the ribs score and form clean metal surfaces in seized fit. And again, the extreme convenience and great saving in time by the principle of scored assemblage with the holding bracket is emphasized.

The mounting bracket 7 in some cases may be secured to the condenser, as in Fig. 13, by riveting. Here, the terminal 4e of the condenser has initially a countersink as shown at s, Fig. 15, and the bracket with a plain round hole as 6', Fig. 12, is assembled on the terminal 4e and the projecting cylindrical edge thereof is spun down or riveted against the bracket. A particularly compact form of bracket is shown in end view at Fig. 14 wherein the bracket 7' is curved to conform to a sufficient extent of the circumference of the condenser to constitute a concave conforming support or cradle thus adding to the security of holding. The arm end to receive the bolts or screws may be of short lateral extent.

The construction shown in Fig. 15 has advantages of assembly and assured contacts. Here the wound up condenser core of foil and intervening insulation, one foil spiral projecting at one end and the other projecting at the opposite end, is given a coating 11, Fig. 16, of liquid metal, as for instance colloidal silver, on the ends, and metal contact washers 12 and terminals 13 are pressed against such coated ends for firm contact, and the synthetic resin encasement is molded on. The washer 12 is a disc and to improve contact it is preferred to provide the discs with penetrating-projections for shallow biting into the foil ends. The projections may be short blade-like punched protrusions 14, Fig. 17 and Fig. 17a, or they may be simple punctures which present points or edges 14a, Fig. 18 and Fig. 18a. The terminals have projections which seat through the central opening of the washers and also providing means to help centering the coil core in molding on the encasing insulation. The terminal 13 shown at the right in Fig. 15 has the projection 16 and a bore clear through, whereby a vacuum can be applied to the interior and an insulating fluid as above described can be introduced if desired. The termnial at the left of Fig. 15 has an imperforate projection 16a, and its outer end is countersunk at s to permit riveting or upsetting against the bracket 7, Fig. 13, as already described. The terminals are desirably peripherally grooved as at 17 to allow the encasing insulation 3 to lock in, and a wire w inserted and secured in the hollow terminal 16 completes the metal connection.

To apply the insulation encasement, the condenser assemblage is positioned in an appropriate mold m, Fig. 19 having contour surfaces to accommodate the assemblage in spaced relation from the mold walls, thereby allowing the liquid insulating material to surround the assemblage, and as the mold is in a chamber 18 with suitable closure, a vacuum is applied by way of connection 19 which is provided with a control valve 20. Mounted above the condenser to supply the insulating material is a reservoir 21, and this also has a closure 22 and a vacuum connection 23 with control valve 24, while the connection 25 from the reservoir 21 to the container 18 has its control valve 26. Thus, a fairly complete vacuum is applied to the container by the connection 19, and then the insulation is run in from the reservoir 21. This reservoir is preferably also under a vacuum by way of its connection 23, but such vacuum need not be the same, and may be higher or lower than that by way of the connection 19 to the container. In other words, a differential vacuum may be applied as desired as regards the mold and the initial supply of the insulative material. The encasement so provided about the condenser assemblage is thus freed from air and moisture. By provision of a convenient closure 28 for the container 18 having a sight glass 29 secured by suitable means such as a holding ring 30 and hermetic sealing, the supplying of the insulation to the mold may be observed, with accuracy. The connection 25 from the insulation reservoir leads to a feed trough 31, which may be swingably mounted at 32, to permit its being slightly swung to one side out of the way in placing and removing the mold. It is seen that this feed trough carries the insulating material in an extended path in exposure to the high vacuum in the container, and the evacuation of the insulating material as regards contained air and moisture is particularly complete. One mold m is illustrated, but it will be understood that a plurality may be provided, and with appropriate feed arrangement.

The inclined feed trough 31 in Fig. 19 is preferably somewhat laterally expanded and thereby increases the area of the insulating material as it gradually flows down to the mold. The extent of exposure for de-aeration of the material is thus increased over what is otherwise possible.

After vacuum has been applied, as above noted, in cases where desired by closing the valve 20 of the vacuum connection 19, and opening the valve 36 on end pipe 35, an insulative fluid can be run in to the chamber 18. Such fluid may be gaseous, as helium, or liquid, as oil, or the like, and it is noticed that fluid to the chamber will have access to the condenser in the mold wall end by way of the end opening of the condenser exposed at the point marked 4 in Fig. 19. On removal from the chamber and mold, the opening to the condenser may be closed by inserting a terminal, as above mentioned.

As an example, a condenser body wound up of foil and paper, is coated at its ends with colloidal silver, and a contact disc and a terminal is inserted into each end of the condenser body, closing the contact disc tightly thereagainst, and as placed in the mold, the assembly is thus held. Then, in the vacuum chamber, vacuum is applied, and at the same time a slightly higher vacuum, as for instance 5–10 microns is applied to the container of liquid polystyrene which is flowed into the chamber to fill the mold. The supply of polystyrene to the mold being cut off, and the vacuum to the chamber being also shut off, insulating oil is admitted to the chamber to be drawn into the evacuated condenser body through its exposed open end, and heat sufficient to set the polystyrene is applied, and finally on removal from the chamber and mold, a terminal wire is inserted into the condenser.

As another example, a condenser body wound up of foil and paper is supplied at one end with an eyelet, and the other end a coating of colloidal silver against which a terminal with flat end spiral is applied. The assembly then being enclosed in a mold and in an evacuating chamber, the vacuum is applied both to the chamber and to a supply container of insulative synthetic resin in communication therewith. Finally, the resin encasement is set by heating.

It will be understood that with the insulative synthetic resin materials as afore-mentioned, the setting or solidifying is accomplished as known, by applying heat, this being on the order of 180 to 200° C., as appropriate with what particular resin is applied.

Other modes of applying the principle of the invention may be employed, change being made as regards the details described, provided the features stated in any of the following claims or the equivalent of such be employed.

I therefore particularly point out and distinctly claim as my invention:

1. In an electrical condenser, a generally cylindrical condenser core, a metal coating covering each end of said core, metal discs overlying the thus coated ends of the core and having sharp projections at their inner faces penetrating the coatings, terminals made of metal seated respectively in substantially central openings provided therefor in said discs, one of said terminals projecting inwardly through the adjacent metal end coating of the core and having a passage therethrough, and a synthetic resin encasement about the assembly of core, discs, and terminals with, however, the outer ends of the terminals being exposed for external connection.

2. The combination set forth in claim 1 characterized further in that a conductive bracket is secured in seized metal fit on an externally projecting end portion of one of the terminals.

References Cited in the file of this patent

UNITED STATES PATENTS

| | | |
|---|---|---|
| 211,953 | Barnum | Feb. 4, 1879 |
| 596,897 | May | Jan. 4, 1898 |
| 2,064,819 | Burlingame | Dec. 22, 1936 |
| 2,133,634 | Rohn | Oct. 18, 1938 |
| 2,140,441 | Clark | Dec. 13, 1938 |
| 2,250,280 | Starbird | July 22, 1941 |
| 2,390,776 | Clemons | Dec. 11, 1945 |
| 2,461,723 | Cowan | Feb. 15, 1949 |
| 2,577,005 | Di Giacomo | Dec. 4, 1951 |
| 2,628,271 | Brafman | Feb. 10, 1953 |
| 2,634,315 | Allison | Apr. 7, 1953 |
| 2,713,700 | Fisher | July 26, 1955 |
| 2,805,372 | Schneider | Sept. 3, 1957 |

FOREIGN PATENTS

| | | |
|---|---|---|
| 983,342 | France | Feb. 7, 1951 |
| 850,925 | Germany | Sept. 29, 1952 |
| 1,094,830 | France | Nov. 24, 1955 |